United States Patent
Inagaki et al.

(10) Patent No.: US 10,224,542 B2
(45) Date of Patent: Mar. 5, 2019

(54) ACTIVE MATERIAL, NONAQUEOUS ELECTROLYTE BATTERY, BATTERY MODULE, BATTERY PACK, AUTOMOBILE AND VEHICLE

(71) Applicant: Kabushiki Kaisha Toshiba, Minato-ku (JP)

(72) Inventors: Hiroki Inagaki, Yokohama (JP); Norio Takami, Yokohama (JP)

(73) Assignee: KABUSHIKI KAISHA TOSHIBA, Minato-ku (KR)

( * ) Notice: Subject to any disclaimer, the term of this patent is extended or adjusted under 35 U.S.C. 154(b) by 0 days.

(21) Appl. No.: 15/444,863

(22) Filed: Feb. 28, 2017

(65) Prior Publication Data

US 2017/0170469 A1    Jun. 15, 2017

Related U.S. Application Data

(63) Continuation of application No. PCT/JP2014/081414, filed on Nov. 27, 2014.

(51) Int. Cl.
*H01M 14/00* (2006.01)
*H01M 4/36* (2006.01)
(Continued)

(52) U.S. Cl.
CPC .......... *H01M 4/366* (2013.01); *C01G 23/005* (2013.01); *H01M 2/1077* (2013.01); *H01M 4/131* (2013.01); *H01M 4/485* (2013.01); *H01M 4/505* (2013.01); *H01M 4/525* (2013.01); *H01M 4/5825* (2013.01); *H01M 10/0525* (2013.01); *H01M 10/425* (2013.01);
(Continued)

(58) Field of Classification Search
CPC ...... H01M 4/366; H01M 4/131; H01M 4/485; H01M 4/505; H01M 4/525; H01M 4/5825; H01M 2/1077; H01M 10/0525; H01M 10/425; H01M 2004/021; H01M 2220/20

See application file for complete search history.

(56) References Cited

U.S. PATENT DOCUMENTS

| | | | |
|---|---|---|---|
| 2005/0281727 A1 | 12/2005 | Yoshizawa et al. | |
| 2012/0328930 A1* | 12/2012 | Inagaki | H01M 4/485 429/163 |
| 2014/0038058 A1 | 2/2014 | Holzapfel et al. | |

FOREIGN PATENT DOCUMENTS

| | | |
|---|---|---|
| JP | 9-199179 | 7/1997 |
| JP | 2001-143702 | 5/2001 |

(Continued)

OTHER PUBLICATIONS

International Search Report dated Mar. 3, 2015 in PCT/JP2014/081414, filed on Nov. 27, 2014 ( with English Translation).

(Continued)

*Primary Examiner* — Jane J Rhee

(74) *Attorney, Agent, or Firm* — Oblon, McClelland, Maier & Neustadt, L.L.P.

(57) ABSTRACT

According to one embodiment, an active material is provided. This active material is represented by the general formula of $Li_{(2+x)}Na_2Ti_6O_{14}$, wherein x is within a range of $0 \le x \le 6$. The active material includes at least one element selected from the group consisting of Zr, Mo, W, V, Nb, Ta, P, Y, Al, Fe, and B in a content of 0.03 to 8.33 atom %.

16 Claims, 5 Drawing Sheets

(51) Int. Cl.
  *H01M 4/485* (2010.01)
  *H01M 4/505* (2010.01)
  *H01M 4/525* (2010.01)
  *H01M 10/0525* (2010.01)
  *H01M 2/10* (2006.01)
  *H01M 4/58* (2010.01)
  *H01M 10/42* (2006.01)
  *C01G 23/00* (2006.01)
  *H01M 4/131* (2010.01)
  *H01M 4/02* (2006.01)

(52) U.S. Cl.
  CPC ...... *C01P 2002/54* (2013.01); *C01P 2002/72* (2013.01); *C01P 2004/61* (2013.01); *C01P 2004/62* (2013.01); *C01P 2004/80* (2013.01); *C01P 2006/12* (2013.01); *C01P 2006/40* (2013.01); *H01M 2004/021* (2013.01); *H01M 2220/20* (2013.01); *Y02E 60/122* (2013.01)

(56) References Cited

FOREIGN PATENT DOCUMENTS

| | | |
|---|---|---|
| JP | 2005-135872 | 5/2005 |
| JP | 2005-267940 | 9/2005 |
| JP | 2006-32321 | 2/2006 |
| JP | 2007-234233 | 9/2007 |
| JP | 2010-040480 | 2/2010 |
| JP | 2012-151121 | 8/2012 |
| JP | 2013-8493 | 1/2013 |
| JP | 2014-511335 | 5/2014 |
| JP | 2014-103032 | 6/2014 |
| KR | 10-2006-0106622 A | 10/2006 |

OTHER PUBLICATIONS

Written Opinion dated Mar. 3, 2015 in PCT/JP2014/081414, filed on Nov. 27, 2014.

Office Action issued in Japanese Application 2016-510854.

Wu, K. et al. "Copper/carbon coated lithium sodium titanate as advanced anode material for lithium-ion batteries", Journal of Power Sources 259, 2014, pp. 177-182.

Wu, K. et al. "Comparative study of $Na_2Li_2Ti_6O_{14}$ prepared by different methods as advanced anode material for lithium-ion batteries", Journal of Electroanalytical Chemistry 717-718, 2014, pp. 10-16.

Yin, S.Y. et al. "Reversible lithium storage in $Na_2Li_2Ti_6O_{14}$ as anode for lithium ion batteries", Electrochemistry Communications 11, 2009, pp. 1251-1254.

\* cited by examiner

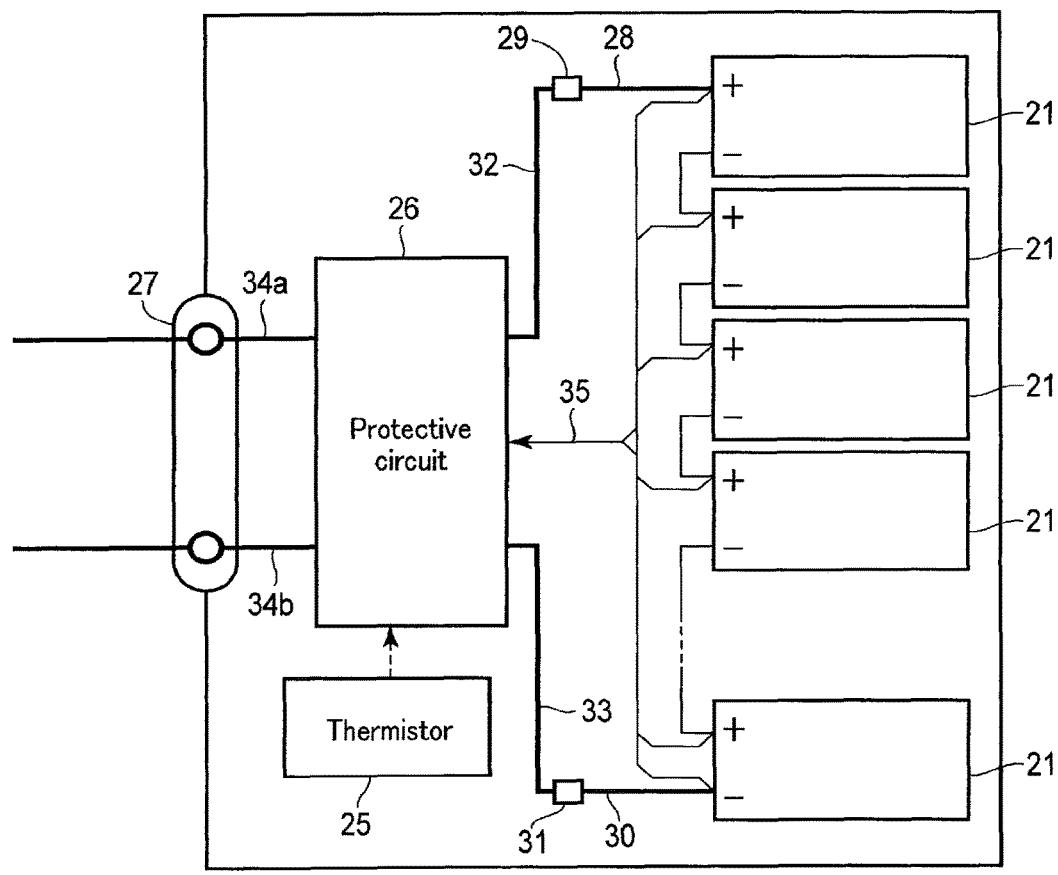
F I G. 5

ACTIVE MATERIAL, NONAQUEOUS ELECTROLYTE BATTERY, BATTERY MODULE, BATTERY PACK, AUTOMOBILE AND VEHICLE

CROSS-REFERENCE TO RELATED APPLICATIONS

This application is a Continuation Application of PCT Application No. PCT/JP2014/081414, filed Nov. 27, 2014, the entire contents of which are incorporated herein by reference.

FIELD

Embodiments described herein relate to an active material battery, a nonaqueous electrolyte battery, a battery module, a battery pack, an automobile, and a vehicle.

BACKGROUND

In recent years, due to rapid technological progress in the electronics field, miniaturization and weight reduction of electronic devices is progressing. As a result, portable and cordless electronic devices have been developed, and it has been desired in a secondary battery serving as a drive source of such an electronic device to achieve miniaturization, weight reduction, and high energy density. In order to meet the requirements, lithium secondary batteries having high energy density have been developed. These days, ultrathin and lightweight secondary batteries using an aluminum laminate film for a casing member have been developed and further commercialized.

In secondary batteries using such an aluminum laminate casing member, the battery thickness changes due to volumetric expansion and contraction of an electrode owing to charge-and-discharge operations. Due to this, there is the problem that the battery may twist, or a distance between electrodes may widen to increase resistance of the battery, so that battery characteristics are lowered.

There have been developed batteries using, in a negative electrode active material, lithium titanate as a material capable of avoiding such a problem. The volume of lithium titanate hardly changes due to charge-and-discharge operations, so that a change in battery thickness is extremely small. The above problem is solved by using this compound as a negative electrode active material.

BRIEF DESCRIPTION OF THE DRAWINGS

FIG. 5 is a block diagram showing an electric circuit of the battery pack of FIG. 4.

DETAILED DESCRIPTION

Figure 1:
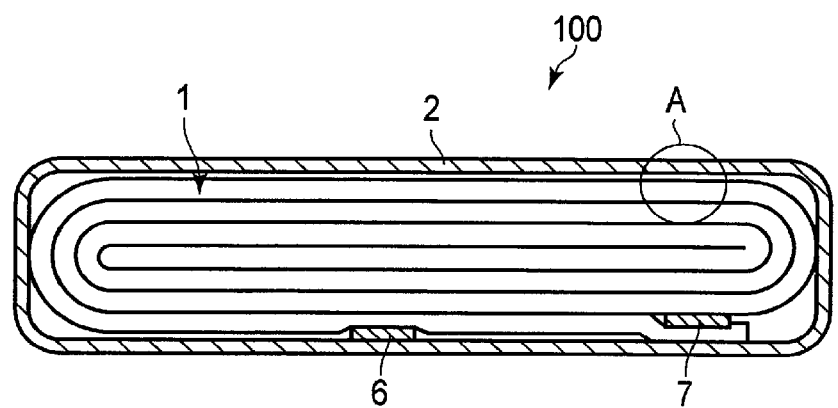
FIG. 1 is a schematic cross-sectional view showing an example of a nonaqueous electrolyte battery according to a second embodiment.

According to one embodiment, an active material is provided. The active material is represented by a general formula of $Li_{(2+x)}Na_2Ti_6O_{14}$, wherein x is within a range of $0 \le x \le 6$. The active material includes at least one element selected from the group consisting of Zr, Mo, W, V, Nb, Ta, P, Y, Al, Fe, and B in a content of 0.03 to 8.33 atom %.

According to the embodiment, a nonaqueous electrolyte battery is provided. The nonaqueous electrolyte battery includes a positive electrode, a negative electrode, and a nonaqueous electrolyte. The negative electrode includes a negative electrode active material. The negative electrode active material includes the active material according to the embodiment.

According to the embodiment, a battery module is provided. The battery module includes nonaqueous electrolyte batteries, each according to the embodiment.

According to the embodiment, a battery pack is provided. The battery pack includes nonaqueous electrolyte batteries, each according to the embodiment.

According to the embodiment, an automobile including the battery pack according to the embodiment is provided. The battery pack is provided in an engine room of the automobile.

According to the embodiment, a vehicle is provided. The vehicle includes the battery pack according to the embodiment.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to a first embodiment, a battery active material is provided. The battery active material is represented by a general formula of $Li_{(2+x)}Na_2Ti_6O_{14}$ (x is within a range of $0 \le x \le 6$). The battery active material includes at least one element selected from the group consisting of Zr, Mo, W, V, Nb, Ta, P, Y, Al, Fe, and B in a content of 0.03 to 8.33 atom %.

A lithium insertion/extraction reaction in lithium titanate progresses at about 1.55 V (vs. $Li/Li^+$). Thus, for example, in a nonaqueous electrolyte battery using lithium titanate in a negative electrode and using $LiMn_2O_4$ in a positive electrode, the average voltage is approximately 2.5 V. The voltage is lower than 3.9 V as the average voltage of a secondary battery including a carbon negative electrode and an $LiMn_2O_4$-positive electrode, that is, a widely commercialized lithium ion secondary battery. Namely, in order to constitute a battery module or a battery pack, which exhibits an average voltage being the same as that of the secondary battery including the carbon negative electrode and the $LiMn_2O_4$-positive electrode, with the use of a nonaqueous electrolyte battery including a negative electrode containing lithium titanate and a positive electrode containing $LiMn_2O_4$, the number of series connections (the number of batteries) is required to be increased as compared with a case using the secondary battery including the carbon negative electrode and the $LiMn_2O_4$-positive electrode.

In view of such a problem, in order to attain a high voltage for a battery, the present inventors have look for a battery active material which can achieve a nonaqueous electrolyte battery in which a lithium insertion/extraction reaction progresses at a lower voltage as compared with lithium titanate and which can exhibit both good output and input performances and life performance equal to those achieved by using lithium titanate.

In a battery active material represented by a general formula of $Li_{(2+x)}Na_2Ti_6O_{14}$ (x is within a range of $0 \leq x \leq 6$), the lithium insertion/extraction reaction progresses at a potential of approximately 1.2 V to 1.4 V (vs. $Li/Li^+$). Thus, a nonaqueous electrolyte battery using a negative electrode including such a titanium-containing oxide exhibits a voltage higher than that of a nonaqueous electrolyte battery including lithium titanate.

On the other hand, as a result of intensive studies, it has been found that the above-described-above titanium-containing oxide exhibits a poor electronic conductivity. Thus, the nonaqueous electrolyte battery using a negative electrode including a titanium-containing oxide may have poor input and output characteristics such as large-current characteristics and may exhibit poor life characteristics.

In view of the above-described problems, as a result of intensive studies made by the present inventors, they found that when at least one element selected from the group consisting of Zr, Mo, W, V, Nb, Ta, P, Y, Al, Fe, and B is included in the battery active material represented by the general formula of $Li_{(2+x)}Na_2Ti_6O_{14}$ (x is within the range of $0 \leq x \leq 6$) in a content of 0.03 to 8.33 atom %, the electronic conductivity of the battery active material represented by the general formula of $Li_{(2+x)}Na_2Ti_6O_{14}$ (x is within the range of $0 \leq x \leq 6$) can be enhanced.

Even if the battery active material represented by the general formula of $Li_{(2+x)}Na_2Ti_6O_{14}$ (wherein x is within the range of $0 \leq x \leq 6$), includes at least one element selected from the group consisting of Zr, Mo, W, V, Nb, Ta, P, Y, Al, Fe, and B in a content of 0.03 to 8.33 atom %, a lithium insertion/extraction reaction in the battery active material can progress at a potential of approximately 1.2 V to 1.4 V (vs. $Li/Li^+$).

As the results, a battery active material according to the first embodiment can achieve a nonaqueous electrolyte battery which is excellent in input and output performance and capable of being stably, repeatedly, and rapidly charged and discharged, that is, is excellent in life performance.

At least one element selected from the group consisting of Zr, Mo, W, V, Nb, Ta, P, Y, Al, Fe, and B can be substituted for a part of Ti sites of a compound represented by the general formula of $Li_{(2+x)}Na_2Ti_6O_{14}$. Preferred elements are Zr, Mo, W, V, Nb, and Ta. More preferred elements are V and Nb. If the content of the above elements are less than 0.03 atom %, the effect of enhancing the electronic conductivity is small. On the other hand, if the content of the above elements are more than 8.33 atom %, a heterogenous phase impairing life performance may be formed. A more preferred substitution amount is 0.04 to 4.17 atom %. The content of the above elements may be measured by inductively coupled plasma (ICP) emission spectrometry.

The battery active material according to the first embodiment may have a granular shape, for example. The battery active material according to the first embodiment may be, for example, primary particles or secondary particles as agglomerates of primary particles.

When the battery active material according to the first embodiment including secondary particles, it is preferable in view of the life characteristics that compression fracture strength of the secondary particles is 10 MPa or more.

Further, when the active material according to the first embodiment includes the secondary particles, the average secondary particle size is preferably from 1 μm to 100 μm. When the average particle size of the secondary particles is within this range, handling is easy in industrial production, and, in addition, in a coating used for production of an electrode, the mass and thickness can be uniformized. In addition, a surface smoothness of an electrode can be prevented from being lowered. The average particle size of the secondary particles is more preferably from 3 μm to 30 μm.

Whether the battery active material includes the secondary particles can be confirmed by scanning electron microscope (SEM) observation, for example.

It is preferable that the primary particles includes in the secondary particles have an average primary particle size of from 1 nm to 10 μm. When the average primary particle size is within this range, handling is easy in industrial production, and, in addition, diffusion of lithium ions in the solid of the titanium-containing oxide can be promoted. The average primary particle size is more preferably from 10 nm to 1 μm. The average primary particle size is particularly preferably from 0.30 μm to 0.98 μm.

The primary particles are preferably isotropic. In this specification, the isotropic particles mean particles having an aspect ratio of not more than 3. Whether the primary particles are isotropic particles can be confirmed by scanning electron microscope (SEM) observation.

In the secondary particles, the specific surface area measured by BET method is preferably from 3 $m^2/g$ to 50 $m^2/g$. When the specific surface area is 3 $m^2/g$ or more, lithium ion insertion/extraction sites can be satisfactorily secured. When the specific surface area is 50 $m^2/g$ or less, handling becomes easy in industrial production. More preferably, for the secondary particles, the specific surface area measured by the BET method is from 5 $m^2/g$ to 50 $m^2/g$.

In the battery active material according to the first embodiment, it is preferable that a carbon-containing phase in at least a portion of a particle surface is formed. The battery active material according to the first embodiment can exhibit a more excellent electronic conductivity by further including the carbon-containing phase. The content of carbon is preferably within a range of from 0.1% by mass to 10% by mass based on the mass of the active material. When the carbon content is within this range, it is possible to obtain the effect of enhancing electronic conduction while satisfactorily securing capacity. More preferably, the carbon content is from 1% by mass to 3% by mass based on the mass of an active material. The carbon content can be quantified by the infrared absorption method after high-frequency heating, for example.

The battery active material according to the first embodiment can further include impurities which are inevitable in production in an amount of 1000 mass ppm or less, in addition to the at least one element selected from the group consisting of Zr, Mo, W, V, Nb, Ta, P, Y, Al, Fe, and B and carbon.

The above-described battery active material according to the first embodiment can be produced as follows, for example.

First, a lithium salt as a Li source, such as lithium hydroxide, lithium oxide, and lithium carbonate, and a sodium salt as a Na source, such as sodium hydroxide, sodium oxide, and sodium carbonate, are provided. Predetermined amounts of those salts are dissolved in purified water. Titanium oxide and an oxide of an additive element are introduced into this solution such that an atom ratio of lithium, sodium, titanium, and an additive element is set to the predetermined ratio. For example, in the case where a titanium-containing oxide having a composition formula of $Li_2Na_2Ti_5NbO_{14}$ is to be synthesized, the above raw materials are mixed such that an atom ratio of lithium, sodium, titanium, and niobium is 2:2:5:1.

Next, the obtained solution is dried while being stirred, thus obtaining a firing precursor. Examples of the drying method include spray drying, granulation drying, freeze-drying, or a combination of these drying methods. The obtained firing precursor is fired to obtain a titanium-containing oxide. Although the firing may be performed in the air atmosphere, it may be performed in an oxygen atmosphere or in an inert atmosphere using argon or the like.

In the above process, although powders may only be mixed without dissolving the Li source and/or the Na source in purified water, it is preferable to perform the above process in order to further uniformly mix the raw materials and suppress generation of impurity phase.

The firing precursor or the mixed raw materials may be fired at a temperature of from 680° C. to 1000° C. for approximately from 30 minutes to 24 hours. Preferably, the firing is performed at a temperature of from 720° C. to 850° C. for from 1 hour to 6 hours.

If the temperature is lower than 680° C., a reaction between titanium oxide and a lithium compound is insufficient, and impurity phases such as anatase type $TiO_2$, rutile type $TiO_2$, and $Li_2TiO_3$ develop, so that the electrical capacity is reduced. If the temperature is higher than 1000° C., a crystallite diameter excessively grows due to progression of firing to lower large-current performance.

A titanium-containing oxide obtained by the above firing is ground and refired under conditions to be hereinafter described, whereby pore volume and average pore diameter of primary particles can be controlled. As the grinding method, a mortar, a ball mill, a sand mill, a vibration ball mill, a planetary ball mill, a jet mill, a counter jet mill, a swirling-flow-type jet mill, a sieve, and the like are usable, for example. In the grinding, there may be used wet grinding where a well-known liquid grinding aid such as water, ethanol, ethylene glycol, benzene, or hexane is coexisted. The grinding aid is effective for improvement of grinding efficiency and an increase in fine powder generation amount. A more preferable method is ball milling using zirconia balls as media, and wet grinding where a liquid grinding aid is added is preferred. An organic substance such as polyol enhancing grinding efficiency may be added as a grinding aid. The type of polyol is not limited particularly, and pentaerythritol, triethylolethane, trimethylolpropane, or the like may be used alone or in combination.

The refiring may be performed in the air atmosphere or may be performed in an oxygen atmosphere or in an inert atmosphere using argon or the like. The refiring may be performed at a temperature of from 250° C. to 900° C. for approximately from 1 minute to 10 hours. If the temperature is 900° C. or higher, firing of a ground powder progresses, and pores are crushed even by heat treatment in a short time, so that it is difficult to obtain pore diameter distribution described in the present embodiment. If the temperature is lower than 250° C., impurities (organic substances) adhered during wet grinding cannot be removed, so that the battery performance is lowered. Preferably, the refiring is performed at a temperature of from 400° C. to 700° C. for from 10 minutes to 3 hours.

A pH value of titanium-containing oxide particles is desirably within a range of 10 to 11.2. In a process of firing titanium-containing oxide particles, lithium carbonate, sodium carbonate, lithium hydroxide, sodium hydroxide, and the like may be by-produced due to unreacted Li and/or Na components not introduced into the titanium-containing oxide. The amount of the unreacted Li and/or Na components is reduced, and the pH value of the titanium-containing oxide particles is set to less than 11.2, whereby the battery performance, and particularly, cycle performance under a high temperature and output performance can be enhanced.

This is because if the unreacted Li and/or Na components, such as lithium carbonate, sodium carbonate, lithium hydroxide, and sodium hydroxide, remain on an active material particle surface, the unreacted Li and/or Na components remaining on the active material particle surface react with nonaqueous electrolyte to produce carbon dioxide or hydrocarbon gas, and an organic film serving as a resistance component is formed on the active material particle surface by the side reactions.

However, when titanium-containing oxide particles are mechanically ground under the above-described conditions, the unreacted Li and/or Na components are exposed on a surface, and the pH value is more than 11.2, so that the battery performance tends to be lowered. Thus, the refiring process is performed after the grinding process. When refiring is performed, the unreacted Li and/or Na components exposed on the surface are introduced into the active material, so that the amount of the unreacted Li and/or Na components remaining on the particle surface can be reduced. Namely, the pH value can be controlled to not more than 11.2 by applying the refiring process after grinding.

In the step of reacting the Li source and Na source such as lithium hydroxide, sodium hydroxide, lithium carbonate, and sodium carbonate, which are raw materials for titanium-containing oxide, with titanium oxide (for example, anatase type $TiO_2$ or rutile type $TiO_2$), the amount of excessive Li salt and/or Na salt such as lithium carbonate and sodium carbonate to be by-produced can be decreased by lowering the ratio of the Li source and/or Na source. However, if the ratio of the Li source and/or Na source is lowered, the ratio of lithium or sodium included in the obtained active material is lowered, so that the electric capacity of titanium-containing oxide is lowered. Thus, in order to maintain a high electric capacity, it is desirable for the pH value of the obtained active material particles to be maintained at not less than 10 without decreasing the amounts of the Li source and the Na source as the raw materials.

Also, it is more preferable that the pH value is within a range of 10.3 to 11 in order to maintain the high electric capacity and in view of the aspect of suppressing the side reaction.

The pH value of the titanium-containing oxide particles can be measured by the following procedure. Namely, 1 g of the titanium-containing oxide particles are dispersed in 50 mL of purified water (25° C.), and the suspension is stirred for about 10 minutes, followed by filtering active material particles to obtain a filtrate. The pH value of the filtrate is taken to be the pH value of the titanium-containing oxide particles.

[Method of Confirming Active Material for Battery According to First Embodiment]

Next, with regard to the battery active material according to the first embodiment, there will be described a method of measuring the contents of elements according to an ICP emission spectrometry, a method of measuring the carbon content, a method of measuring the average particle size of secondary particles, a method of confirming the average particle size of primary particles, and a method of measuring the specific surface area.

When the battery active material according to the first embodiment is a state of being incorporated into a battery, the battery active material can be taken out as follows, for example. First, the battery is brought into a discharged state. For example, the battery is discharged to the rated cut-off voltage under 0.1 C current in an environment of 25° C., whereby the battery can be brought into the discharged state. Next, the battery in the discharged state is disassembled and an electrode (for example, a negative electrode) is taken out from the disassembled battery. The taken-out electrode is cleaned with methyl ethyl carbonate, for example. The cleaned electrode is put into water, and an electrode layer is deactivated in water. The battery active material can be extracted from the deactivated electrode by using a centrifugal separator or the like.

In the extraction processing, for example when polyvinylidene-fluoride is used as a binder, a binder component is removed by cleaning with N-methyl-2-pyrrolidone or the like, and then, a conductive agent is removed with a mesh having an appropriate aperture. If these components slightly remain, they may be removed by heat treatment (for example, at 250° C. for 30 minutes) in the air atmosphere.

(Method of Measuring Content of Elements According to ICP Emission Spectrometry)

The measurement of the contents of elements according to the ICP emission spectrometry can be executed by the following method, for example. The active material extracted by the precedent procedure is weighed and placed in a container, and is subjected to acid fusion or alkali fusion to obtain a measurement solution. The measurement solution is subjected to an ICP spectrometry by a measurement apparatus (for example, SPS-1500V manufactured by SII Nano Technology Inc.), whereby the contents of elements in the active material can be measured. The contents of additive elements in the active material can be measured by such an emission analyzer.

On the other hand, when another active material is included in the electrode, the contents of elements can be measured as follows. The negative electrode active material taken out from the electrode is subjected to TEM-EDX, and a crystal structure of each particle is specified by a selected-area diffraction method. The particles having a diffraction pattern belonging to a general formula of $Li_{(2+x)}Na_2Ti_6O_{14}$ are selected, and an element synthetic content can be measured, by EDX analysis.

(Method of Measuring Carbon Content)

For example, the active material taken out as described above is dried at 150° C. for 12 hours and weighed and placed in a container, and then the content of carbon in the active material can be measured with a measurement apparatus (for example, CS-444LS, manufactured by LECO Corporation).

When another active material is included in an electrode, the content of carbon can be measured as follows. The active material taken out from the electrode is subjected to TEM-EDX, and a crystal structure of each particle is specified by a selected-area diffraction method. The particles each having a diffraction pattern belonging to the titanium-containing oxide are selected, and the content of carbon is measured. At this time, in the case where carbon mapping is obtained by EDX, a region of carbon existing can be known.

(Method of Measuring Average Particle Size of Secondary Particles)

The method of measuring the average particle size of secondary particles is as follows. As a measurement apparatus, a laser diffraction distribution measurement apparatus (Shimadzu SALD-300) is used. First, about 0.1 g of a sample, a surfactant, and 1 to 2 mL of distilled water are put into a beaker and are sufficiently stirred and thus are injected into a stirring water-bath, and where a sample solution is prepared. With the use of this sample solution, the light intensity distribution of the sample is measured 64 times in total at intervals of 2 seconds, and particle size distribution data are analyzed.

(Method of Confirming Average Size of Primary Particles)

The average primary particle size can be confirmed by scanning electron microscope (SEM) observation. An average of primary particle size of ten typical particles extracted from a typical field of view is found, and the average is determined as the average primary particle size.

(Method for Measuring Specific Surface Area)

The specific surface area can be measured by the following method: a molecule of which the adsorption occupying area is known is made to adsorb to the surface of the powder particle at the temperature of liquid nitrogen; and the specific surface area of the powder particle is calculated from the amount of the molecule adsorbed on it. A method that is most frequently used is the BET method using the low-temperature and low-humidity physical adsorption of an inert gas. This method is based on the best-known theory of the method of calculating the specific surface area in which the Langmuir theory as a monolayer adsorption theory is extended to multilayer adsorption. The specific surface area determined by the above method is referred to as "BET specific surface area".

[Method for Confirming Crystal Structure of Active Material According to First Embodiment]

Next, a method for confirming a crystal structure of an active material will be described.

The crystal structure of the active material may be confirmed by wide-angle X-ray diffraction (XRD).

The wide-angle X-ray diffraction measurement of the active material is performed as follows. First, a subject sample is ground until the average particle size is decreased to about 5 µm. As described above, the average particle size may be confirmed by, for example, a laser diffraction method or the like. The ground sample is filled in a 0.2-mm-deep holder portion formed on a glass sample plate. At this time, much care is necessary to fill the holder portion sufficiently with the sample. Special care should be taken to avoid cracking and formation of voids caused by insufficient filling of the sample. Then, a separate glass plate is used to smooth the surface of the sample by sufficiently pressing the separate glass plate against the sample. Much care should be taken to avoid excess or deficiency in the amount of the sample to be filled, thereby preventing any rises and dents in the basic plane of the holder. Then, the glass plate filled with the sample is mounted on the wide-angle X-ray diffractometer to obtain a diffraction pattern by using Cu-Kα rays.

When the orientation of the sample is high, there is the possibility that the position of the peak will shift and the intensity ratio will vary, depending on how the sample is filled. Such a sample is measured after it is made into a pellet form. The pellet may be a green compact having, for example, a diameter of 10 mm and a thickness of 2 mm. The green compact may be produced by applying a pressure of about 250 MPa to the sample for 15 minutes. The obtained pellet is mounted on an X-ray diffractometer to measure the surface of the pellet. The measurement using such a method can avoid differences in measuring result between operators, to thereby improve reproducibility.

When the active material included in the electrode is measured by wide-angle X-ray diffraction, this can be attained by, for example, the following method.

First, in order to understand the crystal state of the active material, the active material is put into a state where lithium ions are completely released from the active material. For example, when the active material is used as, for example, the negative electrode, the battery is put into a completely discharged state. However, lithium ions left unremoved possibly exist in such a discharged state. Next, the battery is disassembled in a glove box filled with argon and washed with an appropriate solvent. As the solvent, it is preferable to use, for example, ethyl methyl carbonate. A part of the electrode having almost the same area as that of the holder of the wide-angle X-ray diffractometer may be cut from the washed electrode and applied directly to the glass holder for the measurement. At this time, XRD is measured in advance corresponding to the type of metal foil of the electrode current collector in order to know where the peak derived from the current collector appears. The presence or absence of peaks derived from ingredients such as a conductive agent and a binder is known in advance. When the peak of the current collector is overlapped on the peak of the active material, it is desirable to perform measurement after the active material is removed from the current collector. The reason for this is that the overlapped peaks are separated from each other when the intensity of each peak is quantitatively measured. Of course, this operation may be omitted if these peaks are known in advance. Although the electrode may be peeled off physically, it is easily peeled off when an ultrasonic wave is applied to the electrode in a solvent. The measurement of the electrode thus recovered enables wide-angle X-ray diffraction measurement of the active material.

The results of wide-angle X-ray diffraction thus obtained are analyzed by the Rietveld method. In the Rietveld method, a diffraction pattern calculated from a crystal structure model estimated in advance is fully fitted to measured values. As a result, parameters (such as lattice constant, atomic coordinate, and occupation) relating to the crystal structure can be precisely analyzed; therefore, the characteristics of the crystal structure of an active material to be measured and a position (site) where additive elements exist can be investigated.

The above-described battery active material according to the first embodiment can be used in any one of negative and positive electrodes of a nonaqueous electrolyte battery. In addition, irrespective of whether it is used in a negative electrode or a positive electrode, it is possible to achieve a nonaqueous electrolyte battery having excellent input and output performance.

When the battery active material according to the first embodiment is used in the positive electrode, as the active material of the negative electrode as a counter electrode for example, metal lithium, lithium alloy, or a carbon material such as graphite or coke can be used.

When the battery active material according to the first embodiment is used as a negative electrode active material in the negative electrode, the material may be used alone or together with a different active material. Examples of other active materials include a lithium-titanium composite oxide having a spinel type structure (such as $Li_4Ti_5O_{12}$), a titanium composite oxide having an anatase-type, rutile-type, or monoclinic β-type structure (such as a-$TiO_2$, r-$TiO_2$, and $TiO_2(B)$), and iron composite sulfides (such as FeS and $FeS_2$).

Similarly, when the active material for an electrode according to the first embodiment is used as a positive electrode active material in the positive electrode, the material may be used alone or together with a different active material. Examples of other active materials include a lithium-titanium composite oxide having a spinel type structure (such as $Li_4Ti_5O_{12}$), a titanium composite oxide having an anatase-type, rutile-type, or monoclinic β-type structure (such as a-$TiO_2$, r-$TiO_2$, and $TiO_2(B)$), and iron composite sulfides (such as FeS and $FeS_2$).

According to the above-described first embodiment, a battery active material is provided. This battery active material is represented by the general formula of $Li_{(2+x)}Na_2Ti_{66}O_{14}$ (wherein x is within the range of $0 \leq x \leq 6$). The battery active material includes at least one element selected from the group consisting of Zr, Mo, W, V, Nb, Ta, P, Y, Al, Fe, and B in a content of 0.03 to 8.33 atom %. As a result, the battery active material according to the first embodiment can achieve a nonaqueous electrolyte battery which can exhibit excellent input and output performances.

Second Embodiment

According to a second embodiment, a nonaqueous electrolyte battery is provided. The nonaqueous electrolyte battery includes a positive electrode, a negative electrode, and a nonaqueous electrolyte. The negative electrode includes a negative electrode active material. The negative electrode active material includes the battery active material according to the first embodiment.

The nonaqueous electrolyte battery according to the second embodiment can further include a separator provided between the positive electrode and the negative electrode. The positive electrode, the negative electrode, and the separator can constitute an electrode group. The nonaqueous electrolyte may be held in the electrode group.

The electrode group may have, for example, a stack-type structure. In the electrode group having the stack-type structure, positive electrodes and negative electrodes are alternately stacked with a separator sandwiching therebetween.

Alternatively, the electrode group may wound-type structure. The electrode group having the wound-type structure can be formed by wind the stack in which a positive electrode, a separator and a negative electrode are stacked.

The nonaqueous electrolyte battery according to the second embodiment can further include a container member accommodating the electrode group and the nonaqueous electrolyte, a positive electrode terminal and a negative electrode terminal.

The positive electrode and the negative electrode are spaced while the separator is sandwiching therebetween. The negative electrode terminal is electrically connected to the negative electrode. The positive electrode terminal is connected to the positive electrode.

Hereinafter, the container member, the negative electrode, the positive electrode, the nonaqueous electrolyte, the separator, the positive electrode terminal, and the negative electrode terminal will be described in detail.

1) Container Member

The container member may be made of, for example, a laminate film having a thickness of 0.5 mm or less. Alternatively, the container member may be a metal case having a wall thickness of 1.0 mm or less. The wall thickness of the metal case is more preferably 0.5 mm or less.

The shape of the container member is not particularly limited, and may be selected from, for example, flat (thin), square, cylinder, coin, or button-shaped. The examples of the container member includes, depending on the size of the battery, that for a compact battery mounted on mobile electronic devices, and a large battery mounted on two- to four-wheel automobiles.

As the laminate film, a multilayer film, in which a metal layer is sandwiched between resin layers, can be used. The metal layer is preferably an aluminum foil or an aluminum alloy foil for reducing weight. The resin layer may be, for example, a polymeric material such as polypropylene (PP), polyethylene (PE), nylon, or polyethylene terephthalate (PET). The laminate film may be heat-sealed to be formed into the shape of a container member.

The metal case is made of aluminum or an aluminum alloy, for example. As the aluminum alloy, an alloy containing an element such as magnesium, zinc, or silicon is preferable. If a transition metal such as iron, copper, nickel, or chromium is contained in the alloy, the content thereof is preferably set to 100 mass ppm or less.

2) Negative Electrode

The negative electrode can include a negative electrode current collector, and a negative electrode layer formed on one or both surfaces of the negative electrode current collector.

The current collector is preferably an aluminum foil or an aluminum alloy foil containing elements such as Mg, Ti, Zn, Mn, Fe, Cu, and Si, each of which is electrochemically stable in the potential range higher than 1 V (vs. Li/Li$^+$). Such an aluminum foil or an aluminum alloy foil can prevent the negative electrode current collector from being molten and being subjected to corrosion degradation.

The thickness of the aluminum foil or the aluminum alloy foil is 20 μm or less, and preferably 15 μm or less. The purity of the aluminum foil is preferably 99% or more. As the aluminum alloy foil, an alloy containing an element such as magnesium, zinc, or silicon is preferable. The content of a transition metal such as iron, copper, nickel, or chromium is preferably set to 1% or less.

The negative electrode layer can include a negative electrode active material, a conductive agent, and a binder.

The battery active material according to the first embodiment can be included in the negative electrode active material. As described in the description of the first embodiment, the negative electrode active material can include a negative electrode active material other than the battery active material according to the first embodiment.

The negative electrode active material preferably has a specific surface area of 0.5 m$^2$/g to 50 m$^2$/g. When the specific surface area is 0.5 m$^2$/g or more, inserting and extracting sites for lithium ions can be sufficiently secured. When the specific surface area is 50 m$^2$/g or less, the negative electrode active material is easily handled in industrial production thereof. More preferably, the specific surface area is 3 m$^2$/g to 30 m$^2$/g.

The conductive agent can improve the current-collecting performance of the negative electrode active material and can reduce the contact resistance with the current collector. As the conductive agent, for example, a carbonaceous substance, a metal powder such as an aluminum powder, or a conductive ceramics can be used. Examples of the carbonaceous substance include acetylene black, carbon black, coke, carbon fiber and graphite. A coke, which has been subjected to heat treatment at 800 to 2000° C. and has an average particle size of 10 μm or less, graphite, powder of TiO$_2$, carbon fiber having an average particle size 1 μm or less are preferably. BET specific surface area of the carbonaceous substance according to N$_2$-adsorption is preferably 10 m$^2$/g.

The binder can make it possible to bind the negative electrode active material and the conductive agent to each other. Examples of the binder include polytetrafluoroethylene (PTFE), polyvinylidene fluoride (PVdF), fluorine-based rubber, and styrene butadiene rubber.

The negative electrode active material, the conductive agent, and the binder in the negative electrode layer are preferably formulated in ratios of 70% to 96% by mass, 2% to 28% by mass, and 2% to 28% by mass, respectively. When the amount of the conductive agent is 2% by mass or more, the current-collecting performance of the negative electrode layer is improved so that the high-current performance of the nonaqueous electrolyte battery can be improved. When the amount of the binder is 2% by mass or more, the binding performance between the negative electrode layer and the current collector is made high so that the cycle performance can be improved. On the other hand, the amounts of the conductive agent and the binder are preferably each 28% by mass or less in order to make the capacity of the battery high.

The negative electrode is produced by, for example, suspending the negative electrode active material, the conductive agent and the binder in a usual solvent to prepare a slurry, by applying the slurry to the surface of the current collector, and by drying the slurry, which is then pressed. Alternatively, the negative electrode may also be produced by forming pellets including the active material, the conductive agent and the binder to produce a negative electrode layer, which is then formed on the current collector.

3) Positive Electrode

The positive electrode can include a current collector, and a positive electrode layer formed on one or both surfaces of the current collector.

The current collector is preferably an aluminum foil, or an aluminum alloy foil containing elements such as Mg, Ti, Zn, Mn, Fe, Cu, and Si.

The positive electrode layer can include a positive electrode active material, a conductive agent, and a binder.

For example, an oxide and a polymer or the like can be used as the positive electrode active material.

Examples of the oxide include manganese dioxide (MnO$_2$), iron oxide, copper oxide and nickel oxide, in each of which lithium is adsorbed, a lithium manganese composite oxide (such as Li$_x$Mn$_2$O$_4$ or Li$_x$MnO$_2$), a lithium nickel composite oxide (such as Li$_x$NiO$_2$), a lithium cobalt composite oxide (such as Li$_x$CoO$_2$), a lithium nickel cobalt composite oxide (such as LiNi$_{1-y}$Co$_y$O$_2$), a lithium manganese cobalt composite oxide (such as Li$_x$Mn$_y$Co$_{1-y}$O$_2$), a lithium nickel manganese cobalt composite oxide (such as Li$_x$(Ni$_a$Mn$_b$CO$_c$)O$_2$, wherein a+b+c=1), a lithium manganese nickel composite oxide having a spinel structure (Li$_x$Mn$_{2-y}$Ni$_y$O$_4$), a lithium phosphorus oxide having an olivine structure (such as Li$_x$FePO$_4$, Li$_x$Fe$_{1-y}$Mn$_y$PO$_4$ and Li$_x$CoPO$_4$), iron sulfate (Fe$_2$(SO$_4$)$_3$), and vanadium oxide (such as V$_2$O$_5$). x and y each described above preferably satisfy the following: 0<x≤1 and 0≤y≤1.

Examples of the polymer include a conductive polymer material such as polyaniline and polypyrrole, and a disulfide-based polymer material. Sulfur (S) and carbon fluoride may also be used as the active material.

Preferred examples of the positive electrode active material include the lithium manganese composite oxide (Li$_x$Mn$_2$O$_4$), the lithium nickel composite oxide (Li$_x$NiO$_2$), the lithium cobalt composite oxide (Li$_x$CoO$_2$), the lithium nickel cobalt composite oxide ($Li_xNi_{1-y}CO_yO_2$), the lithium nickel manganese cobalt composite oxide (such as $Li_x(Ni_aMn_bCo_c)O_2$, wherein a+b+c=1), the lithium manganese nickel composite oxide having a spinel structure ($Li_xMn_{2-y}Ni_yO_4$), the lithium manganese cobalt composite oxide ($Li_xMn_yCo_{1-y}O_2$), and the lithium iron phosphate ($Li_xFePO_4$) each of which has a high positive electrode voltage. x and y each described above preferably satisfy the following: $0<x\leq1$ and $0\leq y\leq1$.

For the view of durability under high-temperature, the more preferable examples of the positive electrode active material is the lithium manganese composite oxide having the spinel structure ($Li_xMn_2O_4$), the lithium nickel manganese cobalt composite oxide having a layered structure (such as $Li_x(Ni_aMn_bCo_c)O_2$, wherein a+b+c=1), and the lithium iron phosphate having an olivine structure ($Li_xFePO_4$). These active materials have high structural-stability and are excellent in reversibility of charge- and discharge. Thus, in any combination with the above-mentioned negative electrode active material, more high life performance and more high durability under high-temperature can be achieved.

Furthermore, nonaqueous electrolyte batteries each including the negative electrode including the battery active material according to the first embodiment and the positive electrode including the lithium manganese composite oxide ($LiMn_2O_4$) or the lithium nickel manganese cobalt composite (such as $Li_x(Ni_aMn_bCO_c)O_2$, wherein a+b+c=1) can constitute, by a five-series connection, 12 V system that can exhibit an excellent compatibility with a lead-acid storage battery. Furthermore, nonaqueous electrolyte batteries each including a negative electrode including the battery active material according to the first embodiment, and a positive electrode including the lithium iron phosphate ($Li_xFePO_4$) can constitute, by a six-series connection, a 12 V system that can exhibit an excellent compatibility with a lead-acid storage battery. Such a construction can enable to provide a battery module and a battery pack that are excellent in durability under high-temperature and can be used in an engine room.

The conductive agent can improve the current-collecting performance of the active material, and can reduce the contact resistance between the active material and the current collector. Examples of the conductive agent include carbonaceous materials such as acetylene black, carbon black and graphite.

The binder can bind the active material with the conductive agent. Examples of the binder include polytetrafluoroethylene (PTFE), polyvinylidene fluoride (PVdF), and fluorine-based rubber.

The positive electrode active material, the conductive agent and the binder in the positive electrode layer are preferably formulated in ratios of 80% to 95% by mass, 3% to 18% by mass, and 2% to 17% by mass, respectively. When the amount of the conductive agent is 3% by mass or more, the above-mentioned effects can be exhibited. When the amount of the conductive agent is 18% by mass or less, the decomposition of the nonaqueous electrolyte on the surface of the conductive agent can be decreased when the battery is stored at high temperature. When the amount of the binder is 2% by mass or more, sufficient positive electrode strength can be obtained. When the amount of the binder is 17% by mass or less, the formulated amount of the binder, which is an insulating material in the positive electrode, is decreased, which decreases the internal resistance.

The positive electrode is produced by, for example, suspending the positive electrode active material, the conductive agent and the binder in a usual solvent to prepare a slurry, by applying the slurry to the surface of the current collector, and by drying the slurry, which is then pressed. Alternatively, the positive electrode may also be produced by forming pellets including the positive electrode active material, the conductive agent and the binder to produce a positive electrode layer, which is then formed on the current collector.

4) Nonaqueous Electrolyte

The nonaqueous electrolyte may be a liquid nonaqueous electrolyte prepared by dissolving an electrolyte in an organic solvent, or a gel-like nonaqueous electrolyte prepared by forming a composite of a liquid electrolyte and a polymer material.

The liquid nonaqueous electrolyte is preferably prepared by dissolving the electrolyte in an organic solvent in a concentration of 0.5 M or more and 2.5 M or less.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethanesulfonate ($LiCF_3SO_3$), bistrifluoromethylsulfonylimide lithium [$LiN(CF_3SO_2)_2$], or mixtures of these compounds. The electrolyte is preferably an electrolyte which is resistant to oxidizing even at a high potential, and $LiPF_6$ is most preferable.

Examples of the organic solvent include cyclic carbonates such as propylene carbonate (PC), ethylene carbonate (EC) and vinylene carbonate; chain carbonates such as diethyl carbonate (DEC), dimethyl carbonate (DMC) and methylethyl carbonate (MEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); γ-butyrolactone (GBL), acetonitrile (AN) and sulfolan (SL). These organic solvents may be used either singularly or in a form of a mixed solvent.

Examples of the polymer material include polyvinylidene fluoride (PVdF), polyacrylonitrile (PAN) and polyethylene oxide (PEO).

The organic solvent is preferably a mixed solvent made of at least two selected from the group consisting of propylene carbonate (PC), ethylene carbonate (EC) and diethyl carbonate (DEC), or a mixed solvent containing γ-butyrolactone (GBL). By use of the mixed solvent, a nonaqueous electrolyte battery having an excellent high-temperature property can be obtained.

5) Separator

The separator may be formed of, for example, a porous film containing polyethylene, polypropylene, cellulose or polyvinylidene fluoride (PVdF), or a synthetic resin nonwoven fabric. A preferable porous film is formed from polyethylene or polypropylene, each of which melts at a predetermined temperature, making it possible to shut off current and can, therefore, improve safety.

6) Negative Electrode Terminal

The negative electrode terminal may be made of, for example, a material having electrical stability and electroconductivity at a potential range from 1 V to 3 V relative to metallic lithium ions. Specific examples thereof include aluminum, and an aluminum alloy containing elements such as Mg, Ti, Zn, Mn, Fe, Cu, and Si. The negative electrode terminal is preferably made of the same material as that of the negative electrode current collector to reduce the contact resistance with the negative electrode current collector.

7) Positive Electrode Terminal

The positive electrode terminal may be made of, for example, a material having electrical stability and electroconductivity at a potential range from 3 to 4.25 V relative to metallic lithium ions. Specific examples thereof include aluminum, and an aluminum alloy containing elements such as Mg, Ti, Zn, Mn, Fe, Cu, and Si. The positive electrode terminal is preferably made of the same material as that of the positive electrode current collector to reduce the contact resistance with the positive electrode current collector.

Next, an example of the nonaqueous electrolyte battery according to the second embodiment will be described with reference to the drawings.

Figure 2:
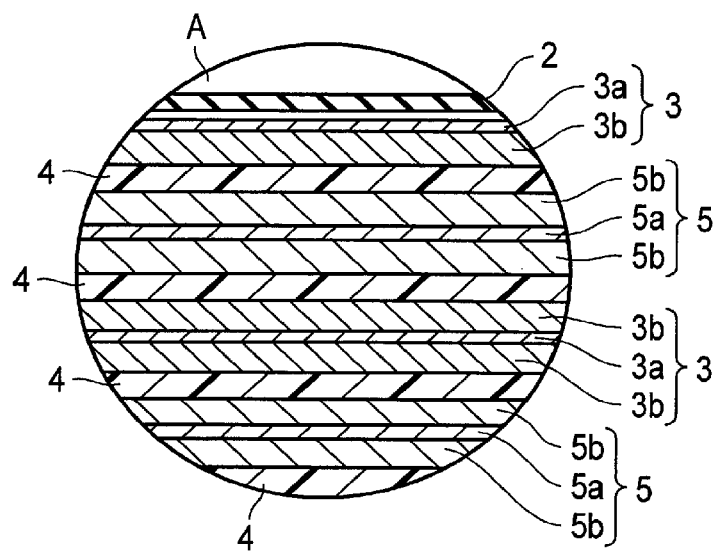
FIG. 2 is an enlarged cross-sectional view of the A-portion of the nonaqueous electrolyte battery of FIG. 1.

FIG. 1 is a schematic cross-sectional view showing an example of a nonaqueous electrolyte battery according to a second embodiment. FIG. 2 is an enlarged cross-sectional view of an A-portion of the nonaqueous electrolyte battery of FIG. 1.

A nonaqueous electrolyte battery 100 shown in FIGS. 1 and 2 includes a flat type wound electrode group 1.

The flat type wound electrode group 1 includes a negative electrode 3, a separator 4, and a positive electrode 5 as shown in FIG. 2. The separator 4 is provided between the negative electrode 3 and the positive electrode 5. The flat type wound electrode group 1 can be formed by, for example, spirally winding a stack formed by stacking the negative electrode 3, one separator 4, the positive electrode 5 and another separator 4 so that one separator 4 is sandwiched between the negative electrode 3 and the positive electrode 5 in a state where the negative electrode 3 is provided outside as shown in FIG. 2, and by subjecting the wound product to press molding.

The negative electrode 3 includes a negative electrode current collector 3a and a negative electrode layer 3b. The outermost negative electrode 3 has a structure in which as shown in FIG. 2, a negative electrode layer 3b is formed on only one of the surfaces of the negative electrode current collector 3a, the surface facing inward. Other negative electrodes 3 each have a structure in which a negative electrode layer 3b is formed on each surface of the negative electrode current collector 3a.

In the positive electrode 5, a positive electrode layer 5b is formed on each surface of a positive electrode current collector 5a.

As shown in FIG. 1, a negative electrode terminal 6 is connected to the negative electrode current collector 3a of the outermost negative electrode 3 and a positive electrode terminal 7 is connected to the positive electrode current collector 5a of the inside positive electrode 5 in the vicinity of the outer peripheral end of the wound electrode group 1.

The wound electrode group 1 is accommodated in a baggy container 2 made of a laminated film obtained by sandwiching a metal layer between two resin layers.

The negative electrode terminal 6 and the positive electrode terminal 7 are externally extended from an opening part of the baggy container 2. For example, a liquid nonaqueous electrolyte is, for example, injected from the opening part of the baggy container 2, and is accommodated in the baggy container 2.

The opening part of the baggy container 2 is closed by heat sealing with the negative electrode terminal 6 and the positive electrode terminal 7 sandwiched at the opening part to thereby fully seal the coil electrode group 1 and the liquid nonaqueous electrolyte.

The nonaqueous electrolyte battery according to the second embodiment, which is described above, includes the battery active material according to the first embodiment, and can exhibit excellent input and output performances.

Third Embodiment

According to a third embodiment, a battery module is provided. The battery module according to the third embodiment includes nonaqueous electrolyte batteries, each according to the second embodiment.

In the battery module according to the third embodiment, the unit batteries may be arranged so that they are electrically connected in series or in parallel, or may be arranged with a combination of series connection and parallel connection.

For example, the battery module according to the third embodiment can include 6 m nonaqueous electrolyte batteries each of which includes a negative electrode including the battery active material according to the first embodiment, a positive electrode including an iron-containing phosphate compound having an olivine structure, and a nonaqueous electrolyte. Herein, m is an integer of 1 or more. The 6 m nonaqueous electrolyte batteries may be connected in series to constitute a battery module. As described in the second embodiment, the nonaqueous electrolyte batteries included in the battery module of this example can constitute, by a six-series connection, a 12 V system that can exhibit an excellent compatibility with a lead-acid storage battery, and is excellent in durability under high-temperature. Thus, the battery module of this example can be used in an engine room together with a lead-acid storage battery.

Further, for example, the battery module according to the third embodiment can include 5 n nonaqueous electrolyte batteries each of which includes a negative electrode including the battery active material according to the first embodiment, a positive electrode including at least one selected from the group consisting of a lithium manganese composite oxide having a spinel structure and a lithium nickel manganese cobalt composite oxide having a layered structure, and a nonaqueous electrolyte. Herein, n is an integer of 1 or more. The 5 n nonaqueous electrolyte batteries may be connected in series to constitute a battery module. As described in the second embodiment, the nonaqueous electrolyte batteries included in the battery module of this example can constitute, by a five-series connection, a 12 V system that can exhibit an excellent compatibility with a lead-acid storage battery, by connecting five batteries in series, and is excellent in durability under high temperature. Thus, the battery module of this example can be used in an engine room together with a lead-acid storage battery.

Next, an example of the battery module according to the third embodiment will be described with reference to drawings.

Figure 3:
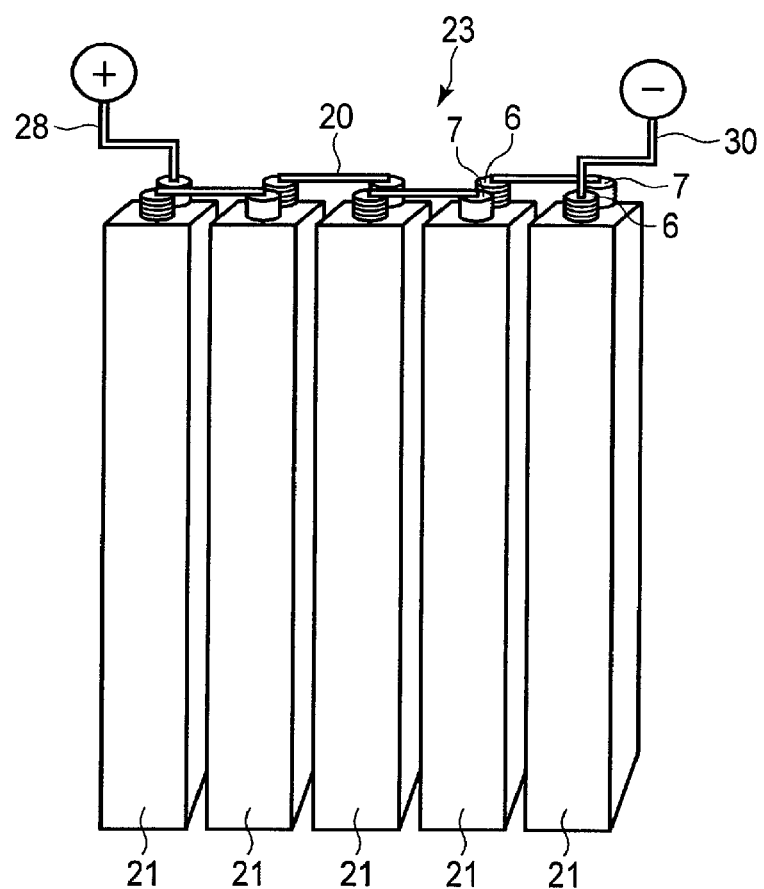
FIG. 3 is a schematic perspective view showing an example of a battery module according to a third embodiment.

FIG. 3 is a schematic perspective view showing an example of the battery module according to the third embodiment. A battery module 23 shown in FIG. 3 includes five unit batteries 21. Each of the five unit batteries 21 is an example of a rectangular nonaqueous electrolyte battery according to the second embodiment.

The battery module 23 shown in FIG. 3 further includes four leads 20. A lead 20 connects a negative electrode terminal 6 of one unit battery 21 with a positive electrode terminal 7 of another unit battery 21. Thus, the five unit batteries 21 are connected in series via the four leads 20. Namely, the battery module 23 shown in FIG. 3 is a five batteries series-connected battery module.

As shown in FIG. 3, the positive electrode terminal 7 of one of the five unit batteries 21 is connected to a positive electrode lead 28 for external connection. On the other hand, the negative electrode terminal 6 of one of the five unit batteries 21 is connected to a negative electrode lead 30 for external connection.

The battery module according to the third embodiment includes the nonaqueous electrolyte battery according to the second embodiment and therefore can exhibit excellent input and output performance.

Fourth Embodiment

A battery pack according to a forth embodiment includes a nonaqueous electrolyte battery according to the second embodiment.

The battery pack according to the fourth embodiment may include one nonaqueous electrolyte battery or may include nonaqueous electrolyte batteries. When the battery pack according to the fourth embodiment includes nonaqueous electrolyte batteries, the unit batteries may be arranged so that they are electrically connected to each other in series or in parallel, or may be arranged with a combination of series connection and parallel connection.

Alternatively, the battery pack according to the fourth embodiment can include the battery module according to the third embodiment.

Next, one example of the battery pack according to the fourth embodiment is explained, referring to the drawings.

Figure 4:
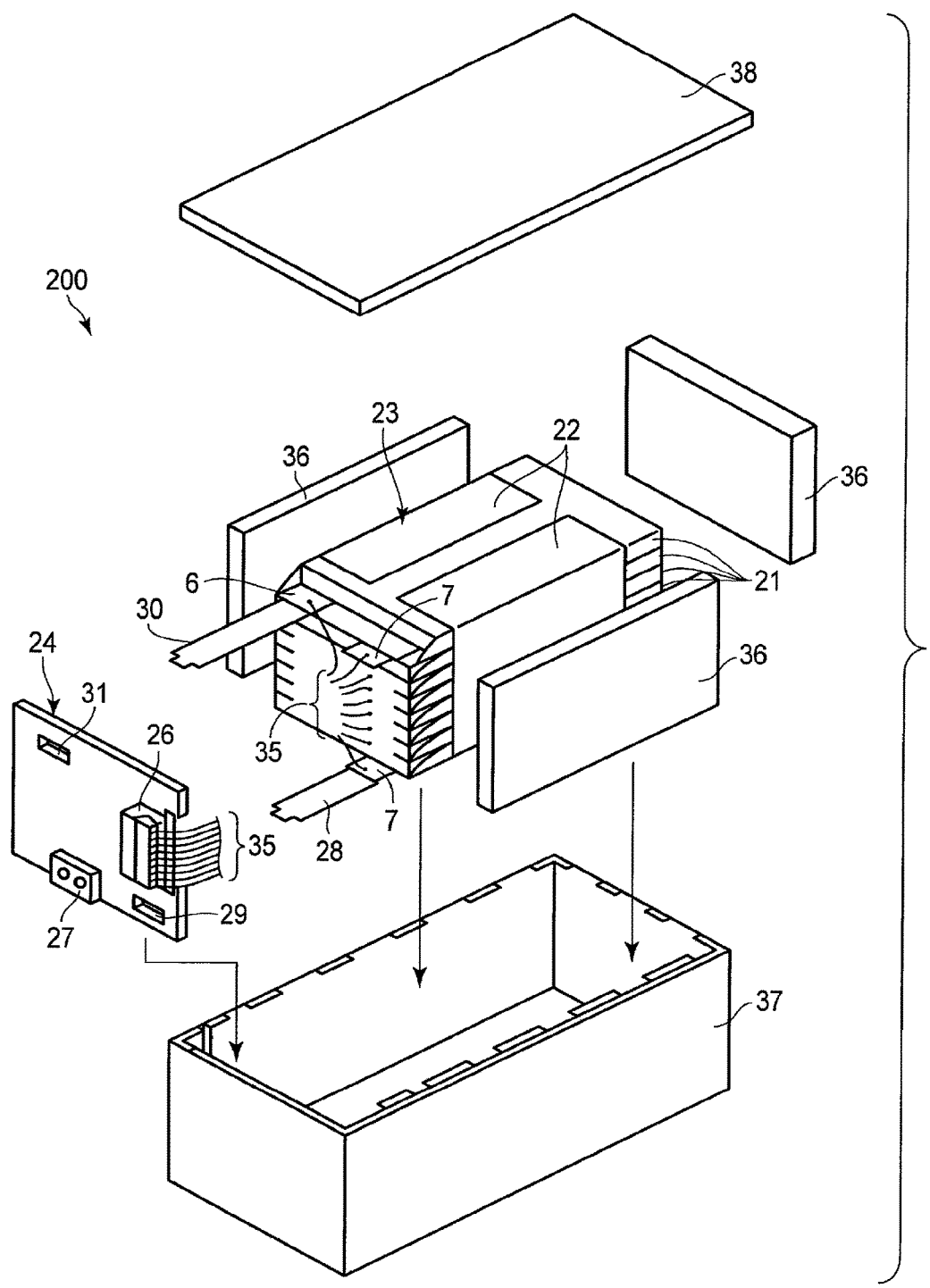
FIG. 4 is an exploded perspective view showing an example of a battery pack according to a fourth embodiment.

FIG. 4 is an exploded perspective view showing an example of a battery pack according to a fourth embodiment. FIG. 5 is a block diagram showing an electric circuit of the battery pack of FIG. 4.

A battery pack 200 shown in FIGS. 4 and 5 includes flat-shaped batteries 21 each having the same structure as that in the nonaqueous electrolyte battery 100 shown in FIG. 1 and FIG. 2. That is, the battery pack 200 shown in FIGS. 4 and 5 includes nonaqueous electrolyte batteries each according to the second embodiment.

The unit batteries 21 are stacked so that a negative electrode terminal 6 and a positive electrode terminal 7 extended to outside are arranged in the same direction, and fastened with an adhesive tape 22 to constitute a battery module 23. The unit batteries 21 are, as shown in FIG. 5, electrically connected to each other in series.

A printed wiring board 24 is arranged opposed to the side face, of side faces of the battery module 23, from which the negative electrode terminals 6 and the positive electrode terminals 7 of the unit batteries 21 are extended. On the printed wiring board 24, as shown in FIG. 5, a thermistor 25, a protective circuit 26, and a power distribution terminal 27 to an external device are mounted. An insulating plate (not shown) is attached to a surface of the printed wiring board 24 facing the battery module 23, in order to avoid unnecessary connections to electrical wiring of the battery module 23.

A positive electrode-side lead 28 is connected to the positive electrode terminal 7 of the unit battery 21 positioned at the bottom of the battery module 23, and the end thereof is inserted into a positive electrode-side connector 29 of the printed wiring board 24 to form an electrical connection. A negative electrode-side lead 30 is connected to the negative electrode terminal 6 of the unit battery 21 positioned at the top of the battery module 23, and the end thereof is inserted into a negative electrode-side connector 31 of the printed wiring board 24 to form an electrical connection. The connectors 29 and 31 are connected to the protective circuit 26 through wirings 32 and 33 formed on the printed wiring board 24.

The thermistor 25 detects a temperature of each of the unit batteries 21, and the detection signals are transmitted to the protective circuit 26. The protective circuit 26 can shut down a plus-side wiring 34a and a minus-side wiring 34b between the protective circuit 26 and the power distribution terminal 27 to an external device under a predetermined condition. The examples of the predetermined condition may include, for example, a case where a signal in which the temperature of the unit battery 21 is a predetermined temperature or higher is received from the thermistor 25. Another examples of the predetermined condition may include a case where over-charge, over-discharge, or over-current of the unit battery 21 is detected. The detection of the over-charge and the like is performed for the individual unit battery 21 or all unit batteries 21. When the detection of the individual unit battery 21 is performed, the battery voltage may be detected, or the positive electrode potential or the negative electrode potential may be detected. In the latter case, a lithium electrode, which is used as a reference electrode, is inserted into individual unit batteries 21. In the battery pack 200 shown in FIG. 4 and FIG. 5, a wiring 35 for detecting a voltage is connected to each of the unit batteries 21, and detection signals are transmitted to the protective circuit 26 via the wiring 35.

Protective sheets 36 including rubber or a resin are arranged on three sides of the battery module 23, except for the side from which the positive electrode terminals 7 and the negative electrode terminals 6 are protruded.

The battery module 23 is housed in a housing container 37 together with the protective sheets 36 and the printed wiring board 24; that is, the protective sheets 36 are arranged on both of long-side inner surfaces of the housing container 37 and on one of short-side inner surfaces, and the printed wiring board 24 is arranged on the other side of the short-side inner surfaces. The battery module 23 is positioned in a space surrounded by the protective sheets 36 and the printed wiring board 24. A lid 38 is attached to a top surface of the housing container 37.

For fixation of the battery module 23, a heat-shrinkable tape may be used instead of the adhesive tape 22. In such a case, the protective sheets are placed on both sides of the battery module, heat-shrinkable tape is wound around them, and then the heat-shrinkable tape is heat-shrunk to bundle the battery module.

The battery pack 200 shown in FIG. 4 and FIG. 5 has a form in which multiple unit batteries 21 are connected to each other in series; however, in the battery pack according to the fourth embodiment, multiple unit batteries 21 may be connected to each other in parallel, in order to increase the battery capacity. Alternatively, the battery pack according to the fourth embodiment can include the unit battery 21 connected in a combination of series connection and parallel connection. Assembled battery packs 200 may be further connected in series or in parallel.

The battery pack 200 shown in FIG. 4 and FIG. 5 includes unit batteries 21, but the battery pack according to the fourth embodiment may include one unit battery 21.

The aspect of the battery pack may appropriately vary depending on the application. The battery pack according to this embodiment is preferably used in an application requiring an excellent cycle performance when a large current is taken out. Specifically, it is used, for example, as a power source for digital cameras, or as a battery mounted on a two- to four-wheeled hybrid electric car, two- to four-wheeled electric car, and an electric assist bicycle. In particular, it is preferably used as a battery mounted on a vehicle.

The battery pack according to the fourth embodiment includes the nonaqueous electrolyte battery according to the second embodiment, and therefore, can exhibit excellent input and output performance.

Fifth Embodiment

An automobile according to the fifth embodiment includes the battery pack according to the fourth embodiment.

Examples of the automobile herein include two- to four-wheel automobiles equipped with an idling stop mechanism, two- to four-wheel hybrid electric automobiles, two- to four-wheel electric automobiles, and power-assisted bicycles and the like.

Figure 6:
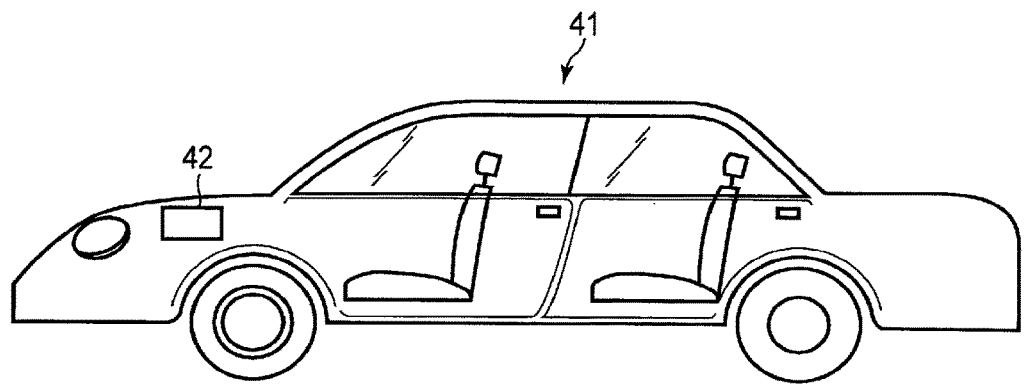
FIG. 6 is a schematic cross-sectional view showing an example of an automobile according to a fifth embodiment.

FIG. 6 shows an example of the automobile according to the fifth embodiment. As shown in FIG. 6, a vehicle 41 of the fifth embodiment has a battery pack 42 according to the fourth embodiment mounted in the engine room. By installing the battery pack at engine room, where will be under high temperature, of the automobile, a distance from the battery pack to electric drive apparatuses such as a motor and an inverter is shortened, thereby reducing output and input losses, and fuel consumption efficiency improves.

According to the fifth embodiment, since the battery pack according to the fourth embodiment is included, it is possible to provide an automobile mounted with an electrochemical apparatus which can exhibit excellent input and output performances.

EXAMPLES

Examples will be described below. However, the present invention is not limited to the following examples, so long as it does not depart from the spirit of the present invention.

Example 1

In Example 1, a beaker cell of Example 1 was manufactured by the following procedure.

<Preparation of Active Material>

First, a lithium carbonate ($Li_2CO_3$) powder, a sodium carbonate ($Na_2CO_3$) powder, a powder of a titanium dioxide ($TiO_2$) having an anatase structure, and a niobium pentoxide ($Nb_2O_5$) powder were provided. Those powders were mixed such that the mass ratio of $Li_2CO_3:Na_2CO_3:TiO_2:Nb_2O_5$ was 7.3890:10.9884:47.8615:0.0957. The obtained mixture was fired at 800° C. for 3 hours to obtain a product. Subsequently, the product obtained above was pulverized by a bead mill using zirconia as media, thus obtaining the battery active material of Example 1.

Through a wide-angle X-ray diffraction method described below, it was confirmed that the obtained battery active material of Example 1 was titanium-containing oxide represented by a general formula of $Li_2Na_2Ti_6O_{14}$. As a result of ICP spectrometric analysis, it was found that a content of Nb was 0.03 atom %. As a result of analysis of the battery active material of Example 1 by the above-described method, it was found that pH was 10.8.

<Wide-Angle X-Ray Diffraction Method>

Figure 7:
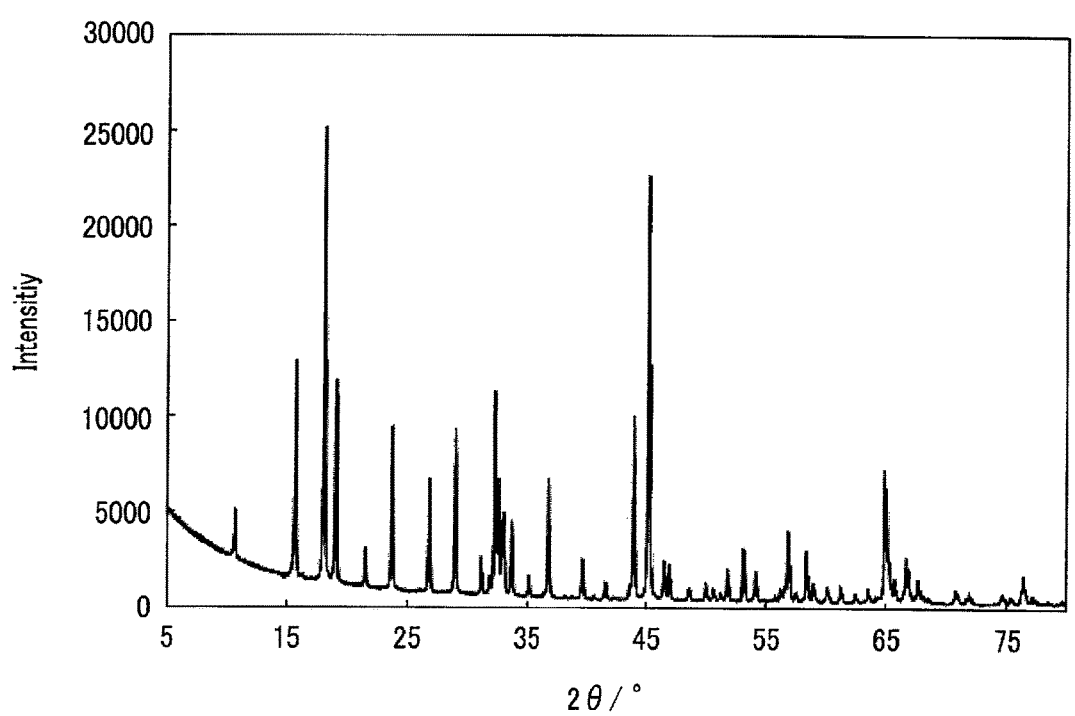
FIG. 7 is an XRD pattern of a battery active material of Example 1.

The battery active material of Example 1 was filled in a standard glass holder having a diameter of 25 mm and subjected to the measurement according to the wide-angle X-ray diffraction method. As a result, an X-ray diffraction pattern shown in FIG. 7 was obtained. From this diffraction pattern, a main substance constituting the obtained titanium-containing oxide was confirmed to be a material represented by the general formula of $Li_2Na_2Ti_6O_{14}$ belonging to 52-690 according to JCPDS (Joint Committee on Powder Diffraction Standards). The devices and conditions used for the measurement are shown as follows:

(1) X-ray generator: RU-200R, manufactured by Rigaku Corporation (Rotating anti-cathode type)
  X-ray source: CuKα rays
  Curved crystal monochromator (using graphite)
  Power: 50 kV, 200 mA (2) Goniometer: 2155S2 type, manufactured by Rigaku Corporation
  Slit system: 1°-1°-0.15 mm-0.45 mm
  Detector: Scintillation counter (3) Count recorder: RINT1400 type, manufactured by Rigaku Corporation (4) Scanning manner: 2θ/θ continuous scanning (5) Qualitative analysis
  Measurement range (2θ) 5 to 1000
  Scanning speed: 2°/min
  Step width (2θ) 0.02°

<Production of Electrode>

The battery active material of Example 1, acetylene black as a conductive agent, and polyvinylidene fluoride (PVdF) were added to N-methylpyrrolidone (NMP) and mixing to prepare a slurry. At this time, the mass ratio of the active material:acetylene black:PVdF was 90:5:5. The slurry was applied onto both surfaces of a current collector formed of an aluminum foil having a thickness of 12 μm, and then dried. Thereafter, the coat was pressed, whereby an electrode having an electrode density of 2.2 g/cm$^3$ (including no current collector) was obtained.

<Preparation of Liquid Nonaqueous Electrolyte>

Ethylene carbonate (EC) and diethyl carbonate (DEC) were mixed at a volume ratio of 1:2 to obtain a mixed solvent. $LiPF_6$ as an electrolyte was dissolved at a concentration of 1 M in the mixed solvent to prepare a liquid nonaqueous electrolyte.

<Production of Beaker Cell>

The produced electrode was used as a working electrode, and lithium metal was used as a counter electrode and a reference electrode to assemble a beaker cell. The liquid nonaqueous electrolyte was injected into the assembled beaker cell to complete a beaker cell of Example 1.

<Measurement of Battery Performance>

Constant-current/constant-voltage discharging was performed on the beaker cell of Example 1 at 0.2 C and 1 V for 10 hours under the environment of 25° C., and lithium was inserted into the battery active material of Example 1. Subsequently, constant-current charging at 0.2 C was performed on the beaker cell of Example 1 until the cell voltage reached 3 V, and lithium was extracted from the battery active material of Example 1. The discharge capacity in that case was defined as 0.2 C capacity. Subsequently, constant-current/constant-voltage discharging was performed at 0.2 C and 1 V for 10 hours, and lithium was inserted into the battery active material of Example 1. Subsequently, constant-current charging at 10 C was performed until the cell voltage reached 3 V, and lithium was extracted from the battery active material of Example 1. The discharge capacity in that case was defined as 10 C capacity. A ratio of the 10 C capacity to the 0.2 C capacity was defined as a rate capacity retention (%), and the results are shown in the following Table 1.

<Specific Surface Area>

The specific surface area of the battery active material of Example 1 was measured by the above method. The specific surface area of the battery active material of Example 1 was 6.4 m$^2$/g.

<Average Particle Size>

As a result of confirmation by SEM, the battery active material of Example 1 was in the form of single particles. The average primary particle size of the battery active material of Example 1 was measured by the above procedure. The average primary particle size of the battery active material of Example 1 was 0.62 μm.

Examples 2 to 6 and Comparative Examples 1 to 2

In Examples 2 to 6 and Comparative Examples 1 to 2, each battery active material of Examples 2 to 6 and Comparative Examples 1 to 2 was prepared by a method similar to Example 1 except that the Nb content was changed to the value described in the following Table 1, and each beaker cell of Examples 2 to 6 and Comparative Examples 1 to 2 was produced using the prepared battery active material.

For each of the battery active material of Examples 2 to 6 and Comparative Examples 1 to 2, various analyses were performed as in Example 1. Further, for each of the beaker cells of Examples 2 to 6 and Comparative Examples 1 to 2, the battery performance was evaluated by a procedure similar to Example 1. The following Table 1 shows the results of the average primary particle size, the specific surface area, the Nb content, the 0.2 C capacity, and the rate capacity retention in Examples 1 to 6 and Comparative Examples 1 to 2. In each of the battery active material of Examples 2 to 6 and Comparative Examples 1 to 2, pH was 10.8 to 10.9.

TABLE 1

| | Average Particle Size (μm) | Specific Surface Area (m²/g) | Content of Nb (atom %) | Capacity (mAh/g) | Rate Capacity Retention (%) |
|---|---|---|---|---|---|
| Comparative Example 1 | 0.62 | 4.1 | 0 | 91 | 62 |
| Example 1 | 0.64 | 4.0 | 0.03 | 92 | 80 |
| Example 2 | 0.62 | 4.2 | 0.04 | 93 | 84 |
| Example 3 | 0.65 | 4.5 | 0.13 | 93 | 86 |
| Example 4 | 0.64 | 4.2 | 1.25 | 93 | 90 |
| Example 5 | 0.67 | 4.4 | 4.17 | 92 | 90 |
| Example 6 | 0.70 | 3.8 | 8.33 | 90 | 90 |
| Comparative Example 2 | 0.70 | 3.8 | 12.5 | 78 | 84 |

The results shown in Table 1 show that the beaker cells of Examples 1 to 6 each using the battery active material including Nb in a content of 0.03 to 8.33 atom % are excellent in capacity and capacity retention as compared to the beaker cells of Comparative Examples 1 to 2 using the battery active material including no Nb or including an excessive amount of Nb.

Examples 11 to 20

In Examples 11 to 20, each battery active material of Examples 11 to 20 was prepared by a method similar to Example 1 except that an active material to which each of various additive elements was added to a raw material in an amount of 0.13 atom % with the use of oxide of each of the various additive elements was synthesized, and each beaker cell of Examples 11 to 20 was produced using the prepared battery active material.

For each of the battery active material of Examples 11 to 20, various analyses were performed as in Example 1. Further, for each of the beaker cells of Examples 11 to 20, the battery performance was evaluated by a procedure similar to Example 1. The following Table 2 shows the results of the average primary particle size, the specific surface area, the kind of additive element, the 0.2 C capacity, and the rate capacity retention in Examples 11 to 20 and the results of Example 3 for comparison. In each of the battery active material of Examples 11 to 20, pH was 10.8 to 10.9.

TABLE 2

| | Average Particle Size (μm) | Specific Surface Area (m²/g) | Additive Element *Additive Amount: 0.13 atom % | Capacity (mAh/g) | Rate Capacity Retention (%) |
|---|---|---|---|---|---|
| Example 11 | 0.62 | 4.2 | Zr | 92 | 88 |
| Example 12 | 0.98 | 3.0 | Mo | 92 | 87 |
| Example 13 | 0.94 | 3.4 | W | 92 | 87 |
| Example 14 | 0.70 | 4.0 | V | 93 | 90 |
| Example 3 | 0.65 | 4.5 | Nb | 93 | 90 |
| Example 15 | 0.65 | 4.4 | Ta | 92 | 88 |
| Example 16 | 0.40 | 8.2 | P | 90 | 89 |
| Example 17 | 0.58 | 4.0 | Y | 78 | 86 |
| Example 18 | 0.60 | 4.0 | Al | 88 | 86 |
| Example 19 | 0.60 | 4.2 | Fe | 92 | 89 |
| Example 20 | 0.30 | 9.1 | B | 86 | 89 |

The results shown in Table 2 show that similar effects can be obtained even if the additive element is changed. It is found that in each of Example 14 in which V is added and Example 3 in which Nb is added, particularly good rate capacity retention is obtained.

Examples 21 to 23

In Examples 21 to 23, the battery active material of Examples 21 to 23 were prepared as follows.

First, maltose was added to the battery active material synthesized in Example 3, and mixed with purified water in a beaker. In Example 21, 2 g of maltose was mixed with 100 g of the battery active material. In Example 22, 5 g of maltose was mixed with 100 g of the battery active material. In Example 23, 15 g of maltose was mixed with 100 g of the battery active material.

Subsequently, each of the mixture was fully dispersed by a stirrer using a rotator, and then dried by evaporation. Thus, a composite in which the particle surface of the battery active material was uniformly coated with an organic substance was obtained. Subsequently, the obtained composite was subjected to carbonization heat treatment by firing at 500° C. for 1 hour in an inert atmosphere under argon flow, thereby carbonizing the organic substance. Thus, each of the battery active material of Examples 21 to 23 was obtained.

In Examples 21 to 23, each beaker cell of Examples 21 to 23 was produced by a method similar to Example 1 except that the battery active material prepared as described above was used.

For each of the battery active material of Examples 21 to 23, the carbon content was measured by the above-described method. Further, for each of the beaker cells of Examples 21 to 23, the battery performance was evaluated by a procedure similar to Example 1. The following Table 3 shows the results of the carbon content, the 0.2 C capacity, and the rate capacity retention in Examples 21 to 23 and the results of Example 3 for comparison.

TABLE 3

| | Carbon Content (mass %) *Content of Nb in Base Material: 0.13 atom % | Capacity (mAh/g) | Rate Capacity Retention (%) |
|---|---|---|---|
| Example 3 | 0 | 92 | 90 |
| Example 21 | 0.3 | 96 | 91 |
| Example 22 | 1 | 108 | 94 |
| Example 23 | 3 | 104 | 94 |

It was found that in the beaker cells of Examples 21 to 23 using the active materials in each which a carbon-containing phase was formed, the capacity and the capacity retention were improved as compared to the beaker cell of Example 3 including no carbon-containing phase. In particular, it was found that high effects were exhibited when the carbon content was 1 to 3% by mass, as in Examples 22 and 23.

Example 41

In Example 41, a nonaqueous electrolyte battery of Example 41 was manufactured using the following materials.

As a negative electrode active material, the battery active material synthesized in Example 1 was used. As a positive electrode active material, a lithium manganese composite oxide ($Li_{1.1}Mn_{1.9}Al_{0.1}O_4$) was used. As a nonaqueous electrolyte, a liquid electrolyte prepared by dissolving $LiBF_4$ at a concentration of 1.5 M in a PC/GBL (1:2) mixed solvent was used. For a container member, a laminate film was used.

The manufactured nonaqueous electrolyte battery of Example 41 was a laminate battery having dimensions of thickness 4 mm×width 72 mm×height 100 mm, and a capacity of 2 Ah. The battery voltage of the battery of Example 41 was 2.85 V. Namely, it could be confirmed that the battery voltage of the nonaqueous electrolyte battery of Example 41 was a voltage compatible with a lead-acid storage battery when five batteries are connected in series.

Example 42

In Example 42, a nonaqueous electrolyte battery of Example 42 was manufactured using the following materials.

As a negative electrode active material, the battery active material synthesized in Example 1 was used. As a positive electrode active material, a lithium nickel manganese cobalt composite oxide ($LiNi_6Mn_2Co_2O_4$) was used. As a nonaqueous electrolyte, a liquid electrolyte prepared by dissolving $LiBF_4$ at a concentration of 1.5 M in a PC/GBL (1:2) mixed solvent was used. For a container member, a laminate film was used.

The manufactured nonaqueous electrolyte battery of Example 42 was a laminate battery having dimensions of thickness 3.4 mm×width 72 mm×height 100 mm, and a capacity of 2 Ah. The battery voltage of the battery of Example 42 was 2.6 V. Namely, it could be confirmed that the battery voltage of the nonaqueous electrolyte battery of Example 42 was a voltage compatible with a lead-acid storage battery when five batteries are connected in series.

Example 43

In Example 43, a nonaqueous electrolyte battery of Example 43 was manufactured using the following materials.

As a negative electrode active material, the battery active material synthesized in Example 1 was used. As a positive electrode active material, lithium iron phosphate ($LiFePO_4$) was used. As a nonaqueous electrolyte, a liquid electrolyte prepared by dissolving $LiBF_4$ at a concentration of 1.5 M in a PC/GBL (1:2) mixed solvent was used. For a container member, a laminate film was used.

The manufactured nonaqueous electrolyte battery of Example 43 was a laminate battery having dimensions of thickness 3.6 mm×width 72 mm×height 100 mm, and a capacity of 2 Ah. The battery voltage of the battery of Example 43 was 1.85 V. Namely, it could be confirmed that the battery voltage of the nonaqueous electrolyte battery of Example 43 was a voltage compatible with a lead-acid storage battery when six batteries are connected in series.

Comparative Example 41

In Comparative Example 41, a nonaqueous electrolyte battery of Comparative Example 41 was manufactured using the following materials.

As a negative electrode active material, graphite was used. As a positive electrode active material, lithium iron phosphate ($LiFePO_4$) was used. As a nonaqueous electrolyte, a liquid electrolyte prepared by dissolving $LiBF_4$ at a concentration of 1.5 M in a PC/GBL (1:2) mixed solvent was used. For a container member, a laminate film was used.

The manufactured nonaqueous electrolyte battery of Comparative Example 41 was a laminate battery having dimensions of thickness 3.6 mm×width 72 mm×height 100 mm, and a capacity of 2 Ah. The battery voltage of the battery of Comparative Example 41 was 3.4 V.

Comparative Example 42

In Comparative Example 42, a nonaqueous electrolyte battery of Comparative Example 42 was manufactured using the following materials.

As a negative electrode active material, the battery active material synthesized in Comparative Example 1 was used. As a positive electrode active material, a lithium manganese composite oxide ($Li_{1.1}Mn_{1.9}A_{10.1}O_4$) was used. As a nonaqueous electrolyte, a liquid electrolyte prepared by dissolving $LiBF_4$ at a concentration of 1.5 M in a PC/GBL (1:2) mixed solvent was used. For a container member, a laminate film was used.

The manufactured nonaqueous electrolyte battery of Comparative Example 42 was a laminate battery having dimensions of thickness 4 mm×width 72 mm×height 100 mm, and a capacity of 2 Ah. The battery voltage of the battery of Comparative Example 42 was 2.85 V. Namely, it could be confirmed that the battery voltage of the nonaqueous electrolyte battery of Comparative Example 42 was a voltage compatible with a lead-acid storage battery when five batteries are connected in series.

[Evaluation]

The nonaqueous electrolyte batteries of Examples 41 to 43 and Comparative Examples 41 and 42 were subjected to a charge-and-discharge cycle test with rates of 1 C charging/1 C discharging under an 80° C. environment, and the cycle capacity retention (%) after 500 cycles was measured. Results are shown in Table 4.

TABLE 4

| | Cycle Capacity Retention (%) |
|---|---|
| Example 41 | 72 |
| Example 42 | 90 |
| Example 43 | 96 |
| Comparative Example 41 | >5 |
| Comparative Example 42 | 60 |

From the results shown in Table 4, it was confirmed that in each of the batteries of Examples 41 to 43 using the battery active material of Example 1 in the negative electrode, the cycle capacity retention was significantly high as compared to Comparative Example 41 using graphite in the negative electrode, and the durability under high-temperature was excellent. In particular, the nonaqueous electrolyte battery of Example 43 exhibited the extremely good cycle capacity retention, where lithium iron phosphate (LiFePO$_4$) was used as the positive electrode active material, and a 1.5 M LiBF$_4$—PC/GBL (1:2) liquid electrolyte was used. On the other hand, for the nonaqueous electrolyte battery of Comparative Example 41 in which graphite was used as the negative electrode active material, the capacity was drastically reduced in several ten cycles, and the capacity after 500 cycles was almost zero.

In addition, the battery of Example 41 using the negative electrode active material of Example 1 was confirmed to have an excellent cycle performance with respect to the battery of Comparative Example 42 using the negative electrode active material of Comparative Example 1.

The battery active material, according to at least one of the embodiments and examples described above, is represented by the general formula of Li$_{(2+x)}$Na$_2$Ti$_6$O$_{14}$ (x is within the range of 0≤x≤6). The battery active material includes at least one element selected from the group consisting of Zr, Mo, W, V, Nb, Ta, P, Y, Al, Fe, and B in a content of 0.03 to 8.33 atom %. As a result, the battery active material according to the first embodiment can achieve a nonaqueous electrolyte battery which can exhibit excellent input and output performances.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material represented by a general formula of Li$_{(2+x)}$Na$_2$Ti$_6$O$_{14}$, wherein x is within a range of 0≤x≤6, and comprising at least one element selected from the group consisting of Zr, Mo, W, V, Nb, Ta, P, Y, Al, and B in a content of 0.03 to 8.33 atom %.

2. The active material according to claim 1, wherein the active material has a granular shape and further comprises a carbon-containing phase formed at least a portion of a surface of the active material.

3. The active material according to claim 1, wherein the active material has the granular shape and an average primary particle size of 0.30 to 0.98 μm.

4. The active material according to claim 1, wherein the active material has the granular shape and a specific surface area of 3 to 50 m$^2$/g.

5. The active material according to claim 1, which is used for a battery.

6. A nonaqueous electrolyte battery comprising:
   a positive electrode;
   a negative electrode comprising a negative electrode active material, the negative electrode active material comprising the active material according to claim 1; and
   a nonaqueous electrolyte.

7. The nonaqueous electrolyte battery according to claim 6, wherein the positive electrode comprises a positive electrode active material, and the positive electrode active material comprises an iron-containing phosphorus oxide having an olivine structure.

8. The nonaqueous electrolyte battery according to claim 6, wherein the positive electrode comprises the positive electrode active material, and the positive electrode active material comprises at least one selected from the group consisting of a lithium manganese composite oxide having a spinel structure and a lithium nickel manganese cobalt composite oxide having a layered structure.

9. A battery module comprising the nonaqueous electrolyte batteries each according to claim 6.

10. A battery module comprising 6 m nonaqueous electrolyte batteries, each according to claim 7, wherein m is an integer of 1 or more, and
    the 6 m nonaqueous electrolyte batteries are connected in series.

11. A battery module comprising 5 n nonaqueous electrolyte batteries, each according to claim 8, wherein n is an integer of 1 or more, and
    the 5n nonaqueous electrolyte batteries are connected in series.

12. A battery pack comprising the nonaqueous electrolyte battery according to claim 6.

13. The battery pack according to claim 12, further comprising:
    a protective circuit; and
    an external power distribution terminal.

14. A battery pack comprising the nonaqueous electrolyte batteries each according to claim 6,
    wherein the nonaqueous electrolyte batteries are electrically connected in series, in parallel, or in combination of series and parallel.

15. A vehicle comprising the battery pack according to claim 12.

16. An automobile comprising the battery pack according to claim 12, wherein the battery pack is provided in an engine room.

* * * * *

UNITED STATES PATENT AND TRADEMARK OFFICE
CERTIFICATE OF CORRECTION

PATENT NO. : 10,224,542 B2
APPLICATION NO. : 15/444863
DATED : March 5, 2019
INVENTOR(S) : Hiroki Inagaki et al.

It is certified that error appears in the above-identified patent and that said Letters Patent is hereby corrected as shown below:

On the Title Page

Item (73), the Assignee's information is incorrect. Item (73) should read:
-- (73) Assignee: KABUSHIKI KAISHA TOSHIBA, Minato-ku (JP) --

Signed and Sealed this
Twenty-first Day of April, 2020

Andrei Iancu
*Director of the United States Patent and Trademark Office*